March 3, 1959 H. C. M. LONGACRE 2,876,324
INDUCTION HEATING APPARATUS
Filed Nov. 29, 1957

INVENTOR
HENRY C. M. LONGACRE
BY
ATTORNEY

United States Patent Office 2,876,324
Patented Mar. 3, 1959

2,876,324

INDUCTION HEATING APPARATUS

Henry C. M. Longacre, Floral Park, N. Y., assignor to Sylvania Electric Products Inc., a corporation of Massachusetts Application November 29, 1957, Serial No. 699,762

6 Claims. (Cl. 219—10.49)

My invention is directed toward apparatus for inductively heating metal parts in an oxygen-free atmosphere.

In the manufacture of various electric components, it is often necessary to braze or weld together metal members constituting a workpiece in an oxygen-free atmosphere. Conventionally, the workpiece to be heated is held within a jig which, in turn, is placed within an evacuated bell jar. A work coil is placed circumferentially about the outside of the jar in the region of the workpiece. High frequency electrical energy is then supplied to the coil, and due to the electromagnetic coupling between the coil and the workpiece, the workpiece is heated and the desired brazing or welding operation ensues.

The above identified process, however, suffers from certain inherent disadvantages. For example, the electromagnetic coupling between the work coil and the workpiece often is not sufficiently "tight" to permit sufficient energy to be supplied to the workpiece. Further, it is difficult to concentrate the electromagnetic field in the exact region to be heated. Moreover, the above process requires an extremely high voltage produced across the coil. When, as is conventional, residual traces of gas are present within the bell jar, the resultant high voltage field established about the work coil can cause the gas to ionize and thus produce a highly destructive electric arc.

I have succeeded in producing apparatus which overcomes these difficulties.

Accordingly, it is an object of the present invention to eliminate the use of a high voltage, high frequency electric field in inductively heating a workpiece contained within a bell jar or other evacuated container.

Another object is, in apparatus of the character indicated, to increase or "tighten" the electromagnetic coupling between the work coil and the workpiece.

Still another object is to provide apparatus of the character indicated, wherein the electromagnetic coupling between the workpiece and the work coil is increased, the electromagnetic field is concentrated in the exact area which is to be heated, and the voltage of the high frequency electric field surrounding the bell jar is reduced to such a value that no arcing can ensue.

These and other objects of my invention will either be explained or will become apparent hereinafter.

In accordance with the principles of my invention, I provide a vacuum-tight enclosure which is either evacuated or filled with an inert gas. A current concentrator, as for example a disc having a central orifice and a slot extending radially outward from the orifice to the periphery of the disc, is disposed within the enclosure. The workpiece to be inductively heated is held in position within the orifice of the concentrator. A single-turn work coil is disposed adjacent the concentrator about the outside of the enclosure. I further provide a generator of high frequency electric energy provided with a tuned output circuit which includes as an inductance a primary winding of a transformer. A single-turn induction coil (which constitutes the secondary winding of the transformer) is coupled to this inductance and further is directly connected to the work coil. Under these conditions, the induction heating operation will ensue without arcing since the induction coil and work coil transform the high voltage-low current electric field produced across the inductance to a low voltage-high current field produced across the work coil. Further, the current concentrator, as will be described in more detail thereafter, both concentrates the electromagnetic field in the exact area to be heated, and further provides the requisite increased or tight coupling between the work coil and the workpiece.

An illustrative embodiment of my invention will now be described in detail with reference to the accompanying drawings, wherein—

Figure 1:
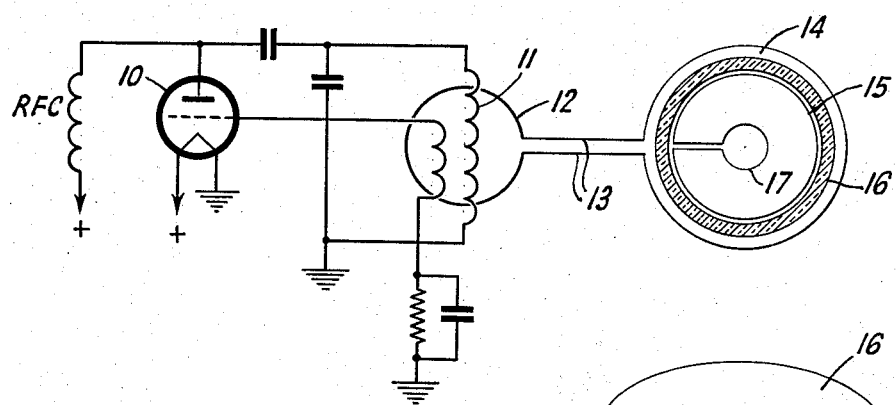
Fig. 1 is a circuit diagram of an embodiment of the invention.

Referring now to Fig. 1, there is shown a conventional oscillator for producing high frequency energy, as for example radio frequency energy, employing a triode 10 and a tuned circuit (tuned to the oscillator frequency) including an inductance 11. Inductance 11 constitutes the primary winding of a transformer; the secondary winding of this transformer is a single-turn induction coil 12. Directly connected to coil 12 by leads 13 is a single-turn work coil 14 circumferentially disposed about bell jar 16 which can be either evacuated or filled with an inert gas. A disc-shaped current concentrator 15 provided with a centrally disposed orifice 17 and a slot running radially outward from the orifice to the periphery of the disc is disposed within the bell jar. The concentrator 15 is aligned with the work coil 14.

Figure 2:
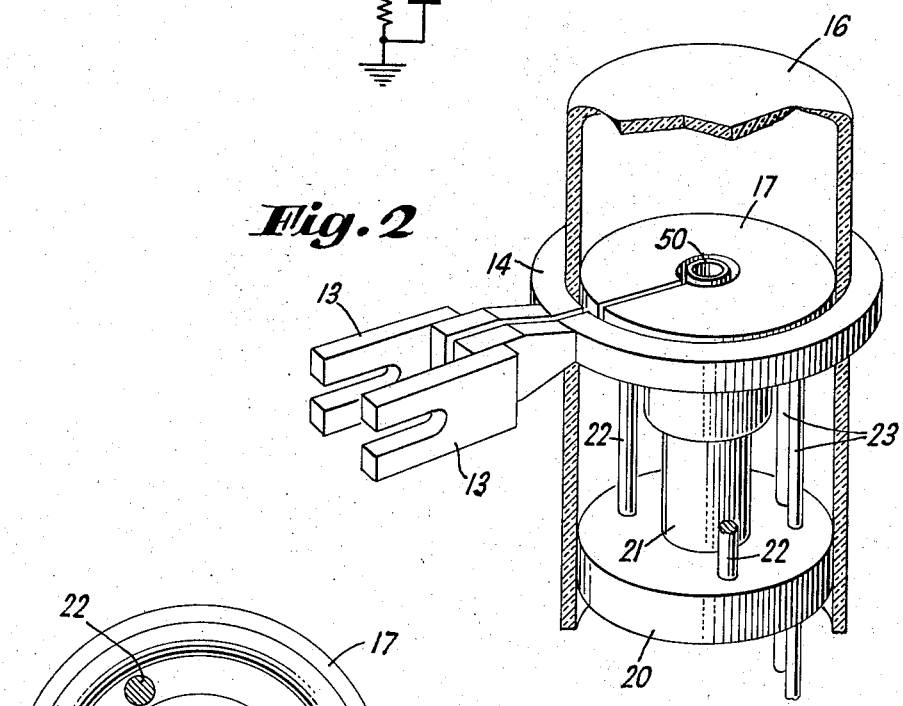
Fig. 2 is an isometric view of a portion of the apparatus shown in schematic form in Fig. 1.
Figure 3:
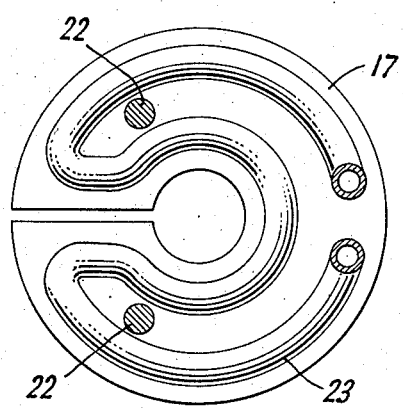
Fig. 3 is an enlarged detail view of the current concentrator of Fig. 2.

As shown in more detail in Fig. 2, workpiece 50 held in place by a jig 21 is positioned within the bell jar 16 in such manner that the workpiece 50 is disposed within the orifice 17 of concentrator 15. The concentrator is held in position above the bottom plate 20 of the bell jar by means of hollow copper conductors 23 and two ceramic supporting members 22, and is cooled by water which is passed through conductors 23 and the concentrator.

When the above described apparatus is actuated, a high voltage-low current electric field at a selected frequency is produced across inductance 11 of the oscillator. Through action of the induction coil 12 and work coil 14, this field is transformed into a high current-low voltage field which is produced across the work coil. Due to the electromagnetic coupling between coil 14 and concentrator 15, this field causes a high current to flow in the concentrator. More particularly, this current flows along the periphery of the copper disc and is carried along the inner surfaces of the slot into the exposed wall of the orifice 17, thereby concentrating the heating effect within the orifice itself.

The orifice, of course, can be so shaped to fit around workpieces of irregular contour. Moreover, the edge of the orifice may be wide or narrow depending upon the desired field configuration; as the edge is narrowed, the field becomes more sharply concentrated.

Maximum power is obtained when the current concentrator is in coaxial alignment with the external work coil 14 and is coplanar therewith. The power input to the concentrator can be gradually decreased by appropriately moving the work coil out of the plane of the current concentrator.

While I have shown and pointed out my invention as applied above, it will be apparent to those skilled in the art that many modifications can be made within the scope and sphere of my invention as defined in the claims which follow.

What is claimed is:

1. In combination with a source of high frequency electrical energy, apparatus for inductively heating a metal workpiece, said apparatus comprising a vacuum tight enclosure; a current concentrator disposed within said enclosure, said concentrator having an orifice in which said workpiece is placed; a single-turn work coil coupled to said source and disposed adjacent said concentrator about the outside of said enclosure, said coil being electromagnetically coupled to said concentrator.

2. In combination with a source of high frequency electrical energy, apparatus for inductively heating a metal workpiece, said apparatus comprising a vacuum tight enclosure; a current concentrator disposed within said enclosure, said concentrator having an orifice in which said workpiece is placed; a single-turn induction coil coupled to said source and responsive to said energy; a single-turn work coil electrically connected to said induction coil and disposed adjacent said concentrator about the outside of said enclosure, said work coil being electromagnetically coupled to said concentrator.

3. In combination, a transformer having primary and secondary windings, said secondary winding being a single-turn induction coil; a single-turn work coil in direct electrical connection with said induction coil, and a current concentrator disposed adjacent but separated from said work coil.

4. In combination with a generator of high frequency electrical energy, apparatus for inductively heating a metal workpiece, said apparatus comprising a bell jar; a generally disc-shaped current concentrator disposed within said jar, said concentrator having a centrally disposed orifice in which said workpiece is placed and further having a slit extending radially between said orifice and the periphery of said concentrator; a single-turn work coil disposed about the outside of said jar adjacent said concentrator and electromagnetically coupled to said concentrator; and a single-turn induction coil directly connected to said work coil and coupled to the output of said generator.

5. The combination as set forth in claim 4, wherein said concentrator is water cooled.

6. In combination, a transformer having primary and secondary windings, said secondary winding being a single-turn induction coil; a source of high frequency electrical energy and having an output circuit including said primary winding; a single-turn work coil in direct electrical connection with said induction coil; and a current concentrator disposed adjacent said work coil and electromagnetically coupled thereto, said concentrator being a disc disposed within said work coil and separated therefrom, said concentrator being provided with a centrally disposed orifice and a slit extending radially between said orifice and the periphery of said disc.

References Cited in the file of this patent

UNITED STATES PATENTS

| 2,625,637 | Garner et al. | Jan. 13, 1953 |
| 2,756,313 | Cater | July 24, 1956 |
| 2,785,265 | Salisbury | Mar. 12, 1957 |